(12) United States Patent
Saito et al.

(10) Patent No.: US 7,738,463 B2
(45) Date of Patent: Jun. 15, 2010

(54) ATM-PON SYSTEM AND ONU AUTOMATIC CONNECTION METHOD

(75) Inventors: Toshiyuki Saito, Yokohama (JP); Takahiro Yoshida, Tokyo (JP); Yasunari Shinohara, Fujisawa (JP); Masatoshi Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1210 days.

(21) Appl. No.: 11/312,350

(22) Filed: Dec. 21, 2005

(65) Prior Publication Data

US 2006/0256811 A1 Nov. 16, 2006

(30) Foreign Application Priority Data

May 11, 2005 (JP) ............................... 2005-137983

(51) Int. Cl.
  *H04L 12/28* (2006.01)
  *H04L 12/56* (2006.01)
  *H04B 10/20* (2006.01)

(52) U.S. Cl. .................. 370/395.2; 398/63; 370/395.6; 370/254

(58) Field of Classification Search ......... 370/254–255, 370/395.2, 395.6, 431–463, 465; 398/63
See application file for complete search history.

(56) References Cited

U.S. PATENT DOCUMENTS

| 5,523,870 | A | * | 6/1996 | Suzuki et al. ............... 398/100 |
| 5,761,197 | A | * | 6/1998 | Takefman .................... 370/337 |
| 5,930,018 | A | * | 7/1999 | Effenberger ................ 398/161 |
| 6,636,527 | B1 | * | 10/2003 | Lee et al. ..................... 370/465 |
| 6,721,504 | B2 | * | 4/2004 | Kim et al. ..................... 398/58 |
| 6,728,248 | B1 | * | 4/2004 | Uchida et al. ............ 370/395.1 |
| 6,778,781 | B2 | * | 8/2004 | Van Eijk et al. ............. 398/100 |
| 6,807,188 | B1 | * | 10/2004 | Blahut et al. ................. 370/442 |
| 6,856,623 | B2 | * | 2/2005 | Hamasaki et al. ........... 370/390 |
| 6,967,949 | B2 | * | 11/2005 | Davis et al. .................. 370/390 |
| 7,142,544 | B2 | * | 11/2006 | Kim et al. ................ 370/395.1 |
| 7,289,439 | B2 | * | 10/2007 | Lee et al. ..................... 370/229 |
| 7,362,704 | B2 | * | 4/2008 | Sisto et al. ................... 370/230 |
| 7,372,854 | B2 | * | 5/2008 | Kang et al. ................. 370/390 |
| 7,382,739 | B2 | * | 6/2008 | Kramer ....................... 370/254 |

(Continued)

FOREIGN PATENT DOCUMENTS

JP 2004-214928 7/2004

OTHER PUBLICATIONS

"Broadband optical access systems based on Passive Optical Networks (PON)" International Telecommunication Union, ITU-T Recommendation G.983.1.

*Primary Examiner*—Chi H Pham
*Assistant Examiner*—Warner Wong
(74) *Attorney, Agent, or Firm*—McDermott Will & Emery LLP

(57) ABSTRACT

OLT is provided with a field for storing the number of effective bits for searching ONU serial numbers, a field for storing a search start serial number and a field for storing a search end serial number, and ONU serial numbers are searched from the search start serial number to the search end serial number within the number of effective bits to automatically perform acquisition of the ONU serial number and ONU connection. An ONU automatic connection method for an ATM-PON system is provided by which an ONU serial number is searched efficiently without registering the ONU serial number from OpS to OLT.

3 Claims, 15 Drawing Sheets

U.S. PATENT DOCUMENTS

| | | |
|---|---|---|
| 7,403,490 B2 * | 7/2008 | Lim et al. .................... 370/254 |
| 7,428,586 B2 * | 9/2008 | Sutherland et al. .......... 709/224 |
| 7,573,897 B2 * | 8/2009 | Elmoalem et al. ........... 370/458 |
| 2002/0006111 A1 * | 1/2002 | Akita et al. .................. 370/235 |
| 2002/0120758 A1 * | 8/2002 | Chang ......................... 709/230 |
| 2002/0171895 A1 * | 11/2002 | Chang ......................... 359/168 |
| 2003/0123482 A1 * | 7/2003 | Kim et al. .................... 370/468 |
| 2003/0137975 A1 * | 7/2003 | Song et al. ................... 370/353 |
| 2004/0028061 A1 * | 2/2004 | Sawada et al. ............... 370/401 |
| 2004/0114568 A1 * | 6/2004 | Beverly ....................... 370/351 |
| 2004/0196869 A1 * | 10/2004 | Tsuchida et al. ............ 370/468 |
| 2005/0047782 A1 * | 3/2005 | Davis et al. .................... 398/58 |
| 2005/0149822 A1 * | 7/2005 | Lee et al. ..................... 714/758 |
| 2005/0249498 A1 * | 11/2005 | Haran et al. .................... 398/58 |
| 2005/0286893 A1 * | 12/2005 | Horiuchi et al. ............... 398/71 |
| 2006/0067691 A1 * | 3/2006 | Hirano et al. .................. 398/71 |
| 2006/0083245 A1 * | 4/2006 | Tanaka et al. ............ 370/395.2 |
| 2007/0140258 A1 * | 6/2007 | Tan et al. ................ 370/395.21 |
| 2007/0201698 A1 * | 8/2007 | Huh et al. .................... 380/256 |
| 2007/0223490 A1 * | 9/2007 | Mizutani et al. ......... 370/395.6 |

* cited by examiner

FIG.4

ONU CONNECTION INFORMATION TABLE — 445

| | ASSIGNMENT FLAG STORAGE FIELD (454) | ONU SERIAL NUMBER STORAGE FIELD (455) |
|---|---|---|
| PON-ID#1 | 1 | 0xAAAA AAAA AAAA AAAA |
| PON-ID#2 | 1 | 0xBBBB BBBB BBBB BBBB |
| PON-ID#3 | 1 | 0xCCCC CCCC CCCC CCCC |
| PON-ID#4 | 0 | — |
| PON-ID#5 | 0 | — |
| ... | ... | ... |
| PON-ID#32 | 0 | — |

FIG.9

| | | | |
|---|---|---|---|
| 1 | IDENT | 25 | GRANT20 |
| 2 | SYNC1 | 26 | GRANT21 |
| 3 | SYNC2 | 27 | CRC |
| 4 | GRANT1 | 28 | GRANT22 |
| 5 | GRANT2 | 29 | GRANT23 |
| 6 | GRANT3 | 30 | GRANT24 |
| 7 | GRANT4 | 31 | GRANT25 |
| 8 | GRANT5 | 32 | GRANT26 |
| 9 | GRANT6 | 33 | GRANT27 |
| 10 | GRANT7 | 34 | CRC |
| 11 | CRC | 35 | MESSAGE_PON_ID |
| 12 | GRANT8 | 36 | MESSAGE_ID |
| 13 | GRANT9 | 37 | MESSAGE FIELD1 |
| 14 | GRANT10 | 38 | MESSAGE FIELD2 |
| 15 | GRANT11 | 39 | MESSAGE FIELD3 |
| 16 | GRANT12 | 40 | MESSAGE FIELD4 |
| 17 | GRANT13 | 41 | MESSAGE FIELD5 |
| 18 | GRANT14 | 42 | MESSAGE FIELD6 |
| 19 | CRC | 43 | MESSAGE FIELD7 |
| 20 | GRANT15 | 44 | MESSAGE FIELD8 |
| 21 | GRANT16 | 45 | MESSAGE FIELD9 |
| 22 | GRANT17 | 46 | MESSAGE FIELD10 |
| 23 | GRANT18 | 47 | CRC |
| 24 | GRANT19 | 48 | BIP |

601

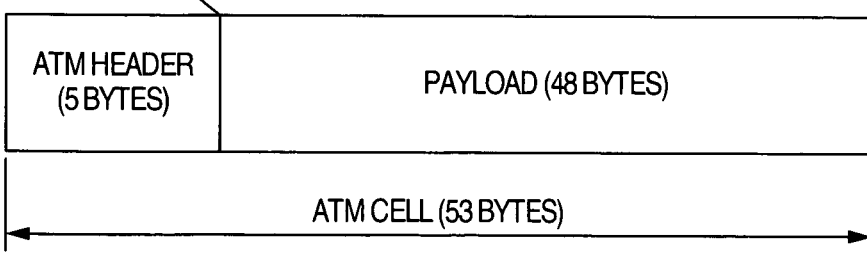

| ATM HEADER (5 BYTES) | PAYLOAD (48 BYTES) |
|---|---|

ATM CELL (53 BYTES)

FIG.10

| | Serial_number_mask message | | |
|---|---|---|---|
| | Octet | Content | Description |
| 602 | 35 | 0100 0000 | Broadcast message to all ONUs |
| | 36 | 0000 0100 | Massage identification "Serial_number_mask" |
| | 37 | nnnn nnnn | Number of valid bits, count started from LSB of byte 45 counting up to the MSB of byte 38 |
| | 38 | abcd efgh | Serial number byte 1 |
| | ... | ...... | |
| | 45 | stuv wxyz | Serial number byte 8 |
| | 46 | Unspecified | |

603 points to octet 37 row. 604 points to octets 38–45 rows.

FIG.12

| | Serial_number_ONU | | |
|---|---|---|---|
| | Octet | Content | Description |
| 606 | 2 | 0100 0000<br>PON_ID | Operating standby state 2<br>Operating standby state 3 |
| | 3 | 0000 0011 | Massage identification "Serial_number_ONU" |
| | 4 | 0000 0000 | Byte 5 to byte 12 form the complete serial number of the ONU |
| | 5 | VID1 | Vendor_ID byte 1 |
| | 6 | VID2 | Vendor_ID byte 2 |
| | 7 | VID3 | Vendor_ID byte 3 |
| | 8 | VID4 | Vendor_ID byte 4 |
| | 9 | VSSN1 | Vendor specific Serial number byte 1 |
| | 10 | VSSN2 | Vendor specific Serial number byte 2 |
| | 11 | VSSN3 | Vendor specific Serial number byte 3 |
| | 12 | VSSN4 | Vendor specific Serial number byte 4 |
| | 13 | Unspecified | |

607 brackets rows 5–12.

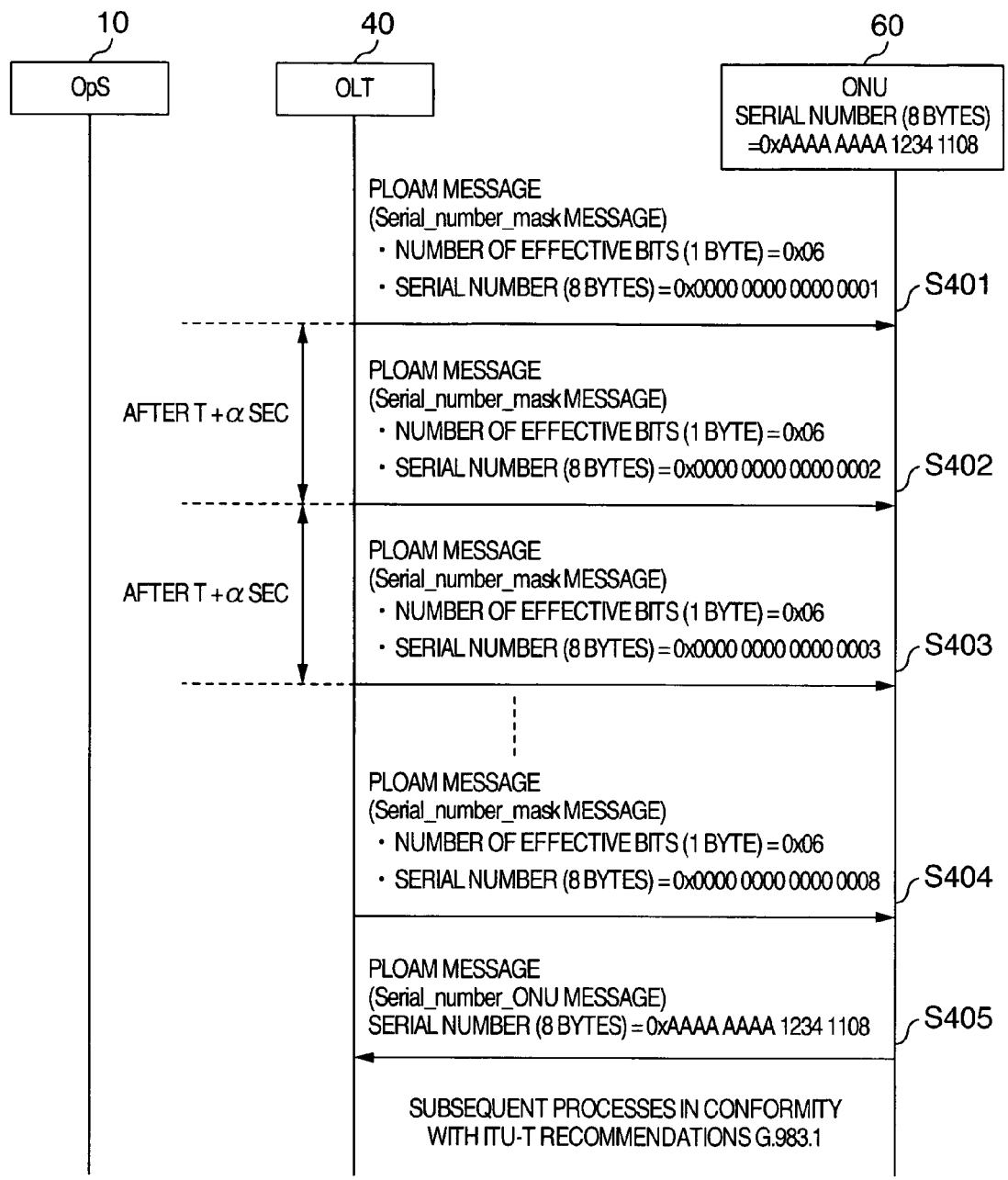

FIG.14

| Octet | Content | | Serial_number_mask_message | 501 |
|---|---|---|---|---|
| 35 | MESSAGE_PON_ID | 0100 0000 | 0x40 | |
| 36 | MESSAGE_ID | 0000 0100 | 0x04 | |
| 37 | MESSAGE_FIELD1 | NUMBER OF EFFECTIVE BITS | 0x06 | |
| 38 — 45 | MESSAGE_FIELD2 — MESSAGE_FIELD9 | SERIAL NUMBER 1 — SERIAL NUMBER 8 | 0x0000 0000 0000 0001 | |
| 46 | MESSAGE_FIELD10 | (Unspecified) | — | |

603 refers to rows 37; 604 refers to rows 38–45.

| Octet | Content | | Serial_number_mask_message | 502 |
|---|---|---|---|---|
| 35 | MESSAGE_PON_ID | 0100 0000 | 0x40 | |
| 36 | MESSAGE_ID | 0000 0100 | 0x04 | |
| 37 | MESSAGE_FIELD1 | NUMBER OF EFFECTIVE BITS | 0x06 | |
| 38 — 45 | MESSAGE_FIELD2 — MESSAGE_FIELD9 | SERIAL NUMBER 1 — SERIAL NUMBER 8 | 0x0000 0000 0000 0008 | |
| 46 | MESSAGE_FIELD10 | (Unspecified) | — | |

603 refers to rows 37; 604 refers to rows 38–45.

| Octet | Content | | Serial_number_ONU_message | 503 |
|---|---|---|---|---|
| 2 | MESSAGE_PON_ID | 0100 0000 | 0x40 | |
| 3 | MESSAGE_ID | 0000 0011 | 0x03 | |
| 4 | MESSAGE_FIELD1 | 0000 0000 | 0x00 | |
| 5 — 12 | MESSAGE_FIELD2 — MESSAGE_FIELD9 | SERIAL NUMBER 1 — SERIAL NUMBER 8 | 0xAAAA AAAA 1234 1108 | |
| 13 | MESSAGE_FIELD10 | (Unspecified) | — | |

607 refers to rows 5–12.

ATM-PON SYSTEM AND ONU AUTOMATIC CONNECTION METHOD

BACKGROUND OF THE INVENTION

1. Field of the Invention

The present invention relates to an automatic connection method for an optical network unit (ONU) or an optical network termination (ONT) in an asynchronous transfer mode—passive optical network (ATM-PON) system.

2. Description of the Related Art

Introducing an ATM-PON system is progressing nowadays as one method of realizing a high speed broadband of an access network. The ATM-PON system is a network system in which a plurality of user side apparatus (ONU: optical network unit) and one station side apparatus (OLT: optical line termination) are connected by optical fibers including a splitter in a star type and communications are performed in a connection section by an ATM communication scheme. In the ATM-PON system, optical signals transmitted from ONU to OLT are subjected to time division multiplexing (TDM). Namely, each ONU is assigned a cell slot permitting transmission of an optical signal, and each ONU transmits an optical signal of its own apparatus in accordance with the assigned cell slot to prevent collision with optical signals of other ONUs.

ITU-T Recommendations G.983.1 "Broadband optical access systems based on Passive Optical Network (PON) describes a series of processes called a ranging flow for establishing communications between OLT and ONU and installing ONU. The ranging process provides a function of determining the cell slot of each ONU by measuring a distance between OLT and ONU and calculating a transmission time of an optical signal. When the distance is measured in the ranging process, it is necessary to make one ONU after another respond in order to avoid collision of ONU responses during measurements. To this end, OLT utilizes a unique serial number assigned to each ONU. Namely, in the ranging process, OLT stores the unique serial number of ONU in a signal to be transmitted to ONU, and ONU received this signal responds if the serial number is its own serial number. ONU whose serial number is recognized by OLT and whose distance can be measured in the ranging process is assigned an identification number called a PON-ID, and thereafter messages are exchanged between OLT and ONU by identifying ONU by PON-ID.

This unique serial number of ONU is defined by 64-bit information and defines that upper 32 bits indicate a vendor ID (a fixed value for each vendor) representative of a vendor, and the lower 32 bits are a vendor definition field which the vendor can define arbitrarily. For example, a manufacture year, month and day and a serial number are assigned in the 32-bit vendor definition field, and the serial number is assigned in all 32 bits, etc., in such a manner that each ONU has a different serial number to allow ONU to be identified.

As described above, the ranging process is required for communications between OLT and ONU, and OLT is required to recognize the serial number of each ONU to execute the ranging process. As a method of making OLT recognize the serial number of each ONU, two methods (Method A, Method B) are disclosed, for example, in 8.4.1.1 of ITU-T Recommendations G.983.1.

Method A registers the serial number of each ONU from an operation apparatus (OpS) to OLT. A conventional ATM-PON system uses actually this Method A for ONT connection. Although ITU-T Recommendations G.983.1 does not show an actual concrete operation procedure, the operation procedure is, for example, as follows when Method A is used. First, in order to register an ONU serial number from OpS to OLT, an ONU work person on duty confirms an ONU serial number on an ONU label when ONU is installed, and notifies an OpS person on duty of the ONU serial number by a phone or the like. Next, the OpS person on duty received this notice registers the ONU serial number from OpS to OLT to establish connection between OLT and ONU. In order to avoid complicatedness of the Method A operation procedure, JP-A-2004-214928 proposes a method of reading a bar code displaying an ONU serial number and installing an external apparatus for automatically setting the read ONU serial number to OpS, between ONU and OpS.

Method B searches an ONU serial number on the side of OLT. ITU-T Recommendations G.983.1 introduces an ONU serial number search method by which various bit patterns are simply tried among 64-bit patterns of ONU serial numbers and a bit pattern of a connected ONU is found on the basis of whether there is a response from ONU.

As described above, the operation procedure of ONU connection of Method A of ITU-T Recommendations G.983.1 is complicated and manually executed so that there is a possibility of erroneous operation and erroneous registration. Although the method of JP-A-2004-214928 can prevent erroneous operation and erroneous registration, it requires au automatic connection apparatus as a new external apparatus.

As the ONU serial number search method of Method B, ITU-T Recommendations G.983.1 presents a method by which ONU serial number search from OLT is made distinguishable between a state of "ONU output collision" and a state of "no ONU and no ONU response" and an ONU serial number is searched by increasing or decreasing the search target bit of the ONU serial number by using a binary tree mechanism. The state of "ONU output collision" is intended to be a state that a plurality of ONUs respond and responses are superposed on a transmission line, whereas the state of "no ONU and no ONU response" is intended to be a state that ONU having an ONU serial address designated by OLT does not exist under the control of OLT.

However, in practice, if a plurality of ONUs respond to an inquiry from OLT and the state enters the state of "ONU output collision", a plurality of ONU responses are superposed on the transmission line and even a timing frame cannot be derived so that OLT cannot receive a response signal. In this case, OLT simply recognizes as the state of "no ONU response" erroneously so that both the states cannot be distinguished and ONU connection through ONU search by the binary tree mechanism is impossible as opposed to expectations.

If all ONU serial number patterns are searched simply by Method B, it is necessary to search patterns of 2 raised to power of 64 ($\approx 18 \times 10^{18}$ patterns) because the ONU serial number is defined by 64 bits, and this is not realistic. Even if the vendor ID field (upper 32 bits) of an ONU serial bit is fixed and only the vender definition field (lower 32 bits) is searched, it is necessary to search patterns of 2 raised to power of 32 ($\approx 0.42$ billion patterns), and this is also not realistic.

SUMMARY OF THE INVENTION

An object of the present invention is to solve the above-described problems of an ATM-PON system and provide an ONU automatic connection method by which an ONU serial number is searched efficiently without registering the ONU serial number from OpS to OLT.

Another object of the present invention is to provide an ONU automatic connection method capable of suppressing a load on a CPU because it is anticipated that the load on CPU of OLT may increase during an ONU automatic connection process.

To achieve the above objects, the present invention proposes an approach to setting to OLT the number of effective bits for determining a search range of ONU identification numbers, a search start number at which the ONU identification number search starts, and a search end number at which the ONU identification number search ends, changing a number between the search start number and search end number and inquiring a plurality of ONUs about whether the number is coincident with the ONU serial number within the range of the number of effective bits.

According to the present invention, in the ATM-PON system, an ONU installation worker is not necessary to contact an OpS manager during ONU installation to input an ONU serial number from OpS to OLT, and efficient ONU automatic installation is possible by automatically searching an ONU serial number from a search start serial number to a search end serial number within a range of the smaller number of predetermined effective bits.

Another advantage of the present invention is that a load on a CPU of OLT can be reduced by executing an ONU automatic connection process periodically or executing the ONU automatic connection process when there occurs an instruction from OpS or the like.

BRIEF DESCRIPTION OF THE DRAWINGS

FIG. 4 shows an example of the structure of an ONU connection information table according to the present invention.

FIG. 9 is an illustrative diagram showing the contents of a payload of a PLOAM cell in a downstream.

FIG. 10 is an illustrative diagram showing the format of a Serial-number-ONU message.

FIG. 12 is an illustrative diagram showing the format of a Serial_number_ONU message.

FIG. 13 shows an example of a sequence related to ONU serial number acquisition.

FIG. 14 is a diagram showing an example of message contents of the sequence example shown in FIG. 13.

DESCRIPTION OF THE EMBODIMENTS

Embodiments of the present invention will be described with reference to the accompanying drawings.

Figure 1:
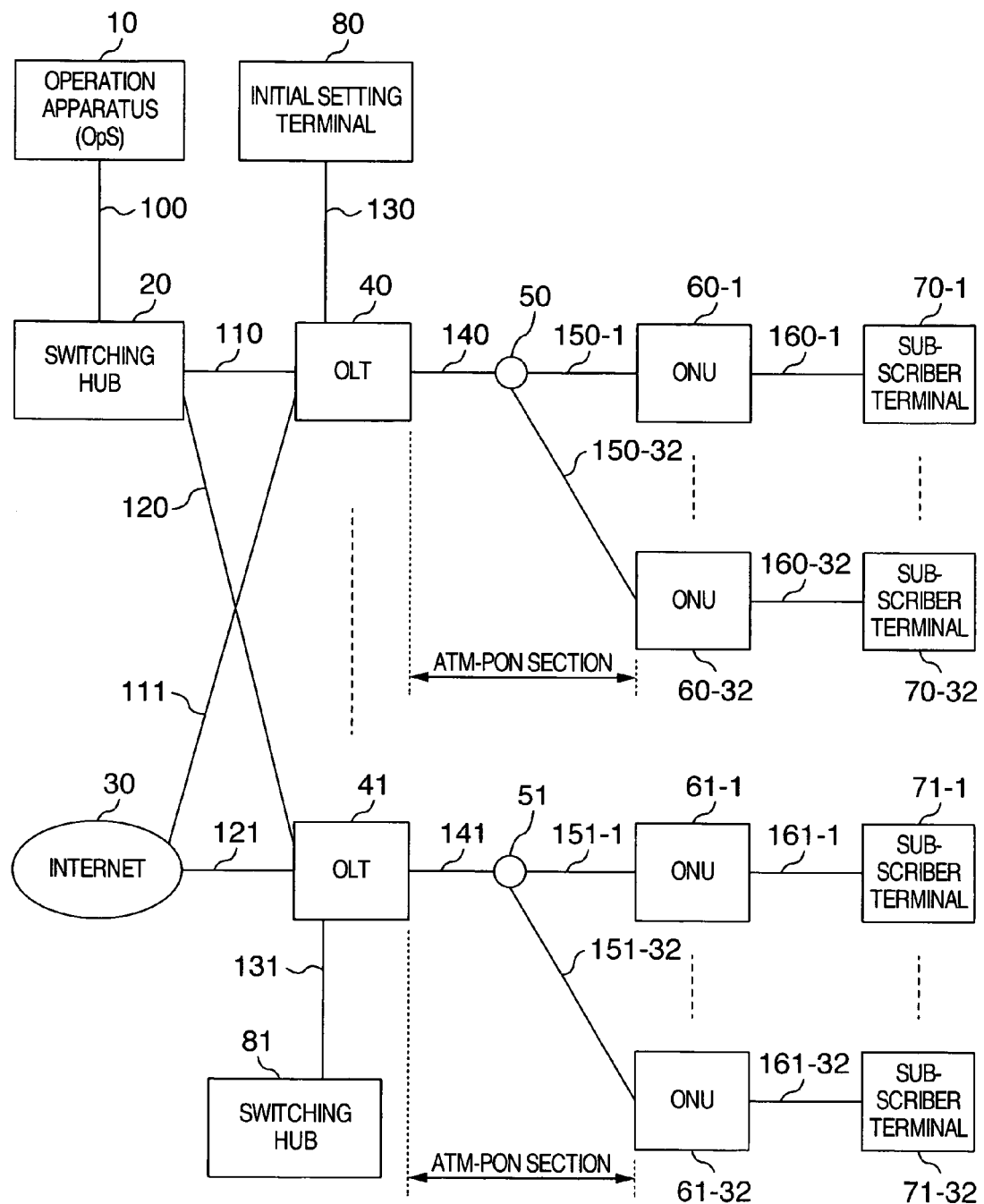
FIG. 1 shows an example of the overall system configuration of an ATM-PON system according to the present invention.

FIG. 1 shows an example of the overall system configuration of an ATM-PON system according to the present invention. Referring to FIG. 1, an OLT 40 is connected to a plurality of ONU 60-1 to 60-32 via optical fibers 140, 150-1 to 150-32 and an optical splitter 50. The optical splitter 50 distributes an optical signal output from OLT 40 to the optical fiber 140 uniformly to the plurality of ONUs 60-1 to 60-32, and transfers optical signals output from the optical fibers 150-1 to 150-32 to OLT 40 through time division multiplexing. Each ONU 60-1 to 60-32 is connected to a subscriber terminal 70-1 to 70-32 via lines 160-1 to 160-32 such as Ethernet (registered trademark).

An operation apparatus 10 for management and settings of the ATM-PON system is connected to OLTs 40 and 41 via lines 100, 110 and 111 such as Ethernet (registered trademark) and a switching hub 20 for transfer of Ethernet (registered trademark) frames. Initial setting terminals 80 and 81 are used for initial settings of various parameters and the like at the time of initial settings of OLTs 40 and 41, as a pre-stage of connecting the operation apparatus 10, and are connected via lines 130 and 131 such as serial cables. OLTs 40 and 41 are connected to the Internet 30 via lines 120 and 121 such as Ethernet (registered trademark) so that services such as Internet accesses can be supplied to the subscriber terminals 70-1 to 70-32, and 71-1 to 71-32.

Next, the structure of an ONU serial number will be described. The ONU serial number is defined by 64 bits, the upper 32 bits being a vendor-specific vendor ID (fixed value for each vendor) and the lower 32 bits being a vendor definition field the vendor can define arbitrarily. Even if only a vendor definition field is searched in searching the ONU serial number, there are patterns of 2 raised to power of 32. It is not realistic to search simply all patterns.

It is defined actually that the maximum number of ONUs connected to one OLT is thirty two units (or sixty four units) (refer to Tables 10 and 11 of ITU-T Recommendations G.983.1. Namely, if ONUs are inquired about serial numbers of patterns of 2 raised to power of 6=64 patterns (or 2 raised to power of 7=128 patterns) and one of ONUs responds that the serial number is coincident with the inquired serial number, the ONU serial number can be searched in a short time. In this case, even if 64 patterns (or 128 patterns) are inquired by using 64 bits of the total bit width of the serial number or by using all lower 32 bits, a probability of bit pattern matching is almost zero. However, if 64 patterns (or 128 patterns) are inquired by limiting the serial numbers to a portion of each bit pattern, a probability of bit pattern matching becomes high. Since the maximum number of ONUs connected to OLT is fixed, if the bit width of a search serial number is determined so as to generate patterns larger than the maximum number of patterns, a single ONU having a coincident bit pattern can be identified. Further, if a distribution of serial numbers of ONUs to be installed are known in advance, it is more convenient if a search start serial number and a search end serial number can be determined.

According to the present invention, therefore, OLTs 40 and 41 are provided with a field for storing the number of effective bits representing a bit width to be used for ONU serial number search, a field for storing a search start serial number and a field for storing a search end serial number. ONUs are searched by using a small number of search patterns to efficiently and automatically perform ONU connection In the following, specific embodiments of the present invention will be described in detail with reference to the accompanying drawings.

First Embodiment

Figure 2:
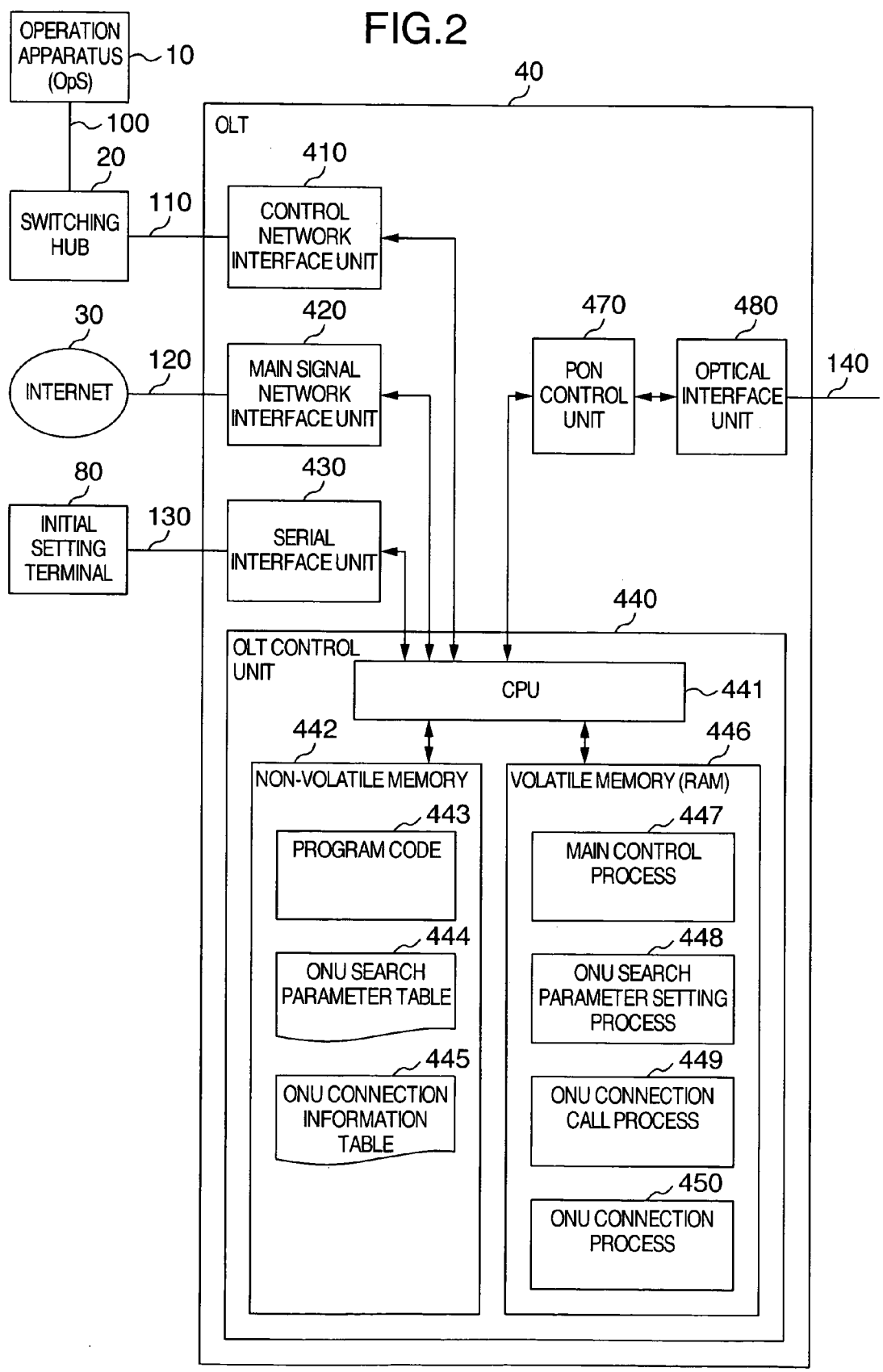
FIG. 2 is a block diagram showing the structure of an OLT according to an embodiment of the present invention.

FIG. 2 is a block diagram showing the structure of OLT 40 according to an embodiment of the present invention. OLT 40 shown in FIG. 2 has: a control network interface unit 410 connected to the operation apparatus 10 or switching hub 20; a main signal network interface unit 420 connected to the Internet 30; a serial interface unit 430 connected to the initial setting terminal 80; an optical interface unit 480 connected to ONU via the optical fiber 140 and optical splitter 50 and including E/O conversion and O/E conversion; a PON control unit 470 connected to the optical interface unit 480 for PON control; and an OLT control unit 440 for OLT control.

The OLT control unit 440 has a CPU 441, a non-volatile memory 442 and a volatile memory 446. CPU 441 reads programs and data stored in these memories to execute various functions. Although the non-volatile memory 442 is assumed to be a flash memory, it may be an EPROM or an EEPROM. The non-volatile memory 442 stores program codes 443, an ONU search parameter table 444 and an ONU connection information table 445. The program codes 443 are an OS and applications to be executed by CPU 441, and are loaded from the non-volatile memory 442 into the volatile memory 446 when the OLT is activated.

A main control process 447, an ONU search parameter setting process 448, an ONU connection call process 449, an ONU connection process 450 and the like are a portion of the program codes 443. The main control process 447 is a main routine for OLT control, and activates the ONU search parameter setting process 448 and ONU connection call process 449, when necessary.

Figure 3:
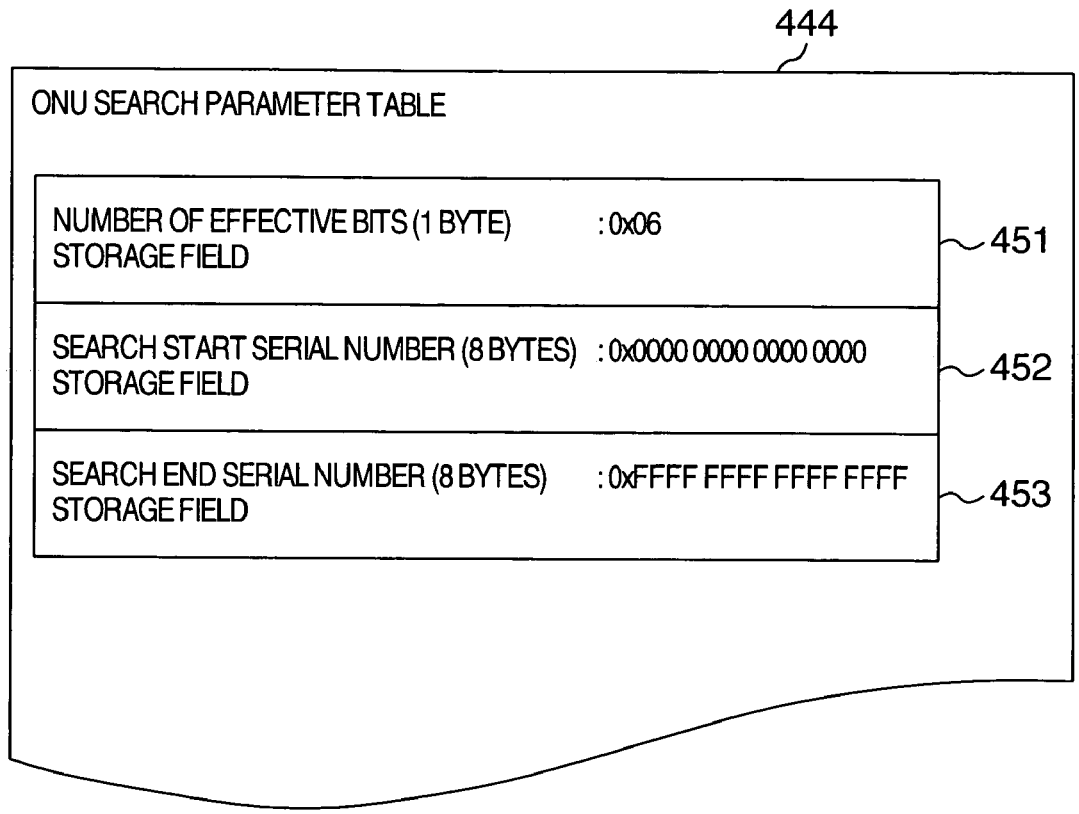
FIG. 3 shows an example of the structure of an ONU search parameter table according to the present invention.

FIG. 3 shows an example of the structure of the ONU search parameter table 444. The ONU search parameter table 444 stores search parameters for ONU serial numbers according to the embodiment. Referring to FIG. 3, the ONU search parameter table 444 has: a field 451 for storing the number of effective bits as counted from the least significant bit (LSB) to be used for comparison with ONU serial numbers; a field 452 for storing a comparison start serial number; and a field 453 for storing a comparison end serial number. A range of a bit train designated by the number of effective bits is not necessarily required to start from the lowest significant bit. A range starting from the upper level bit, a range of intermediate bits and the like may be used if the range designated by the number of effective bits is a portion of a train of consecutive bits included in the serial numbers.

FIG. 4 shows an example of the structure of the ONU connection information table 445 according to the embodiment. In this embodiment, the ONU connection information table 445 stores each searched and found ONU serial number in correspondence with "PON-ID". PON-ID is an ID for identifying ONU to which a message is sent from OLT to ONU, and is assigned by OLT after OLT identifies an ONU serial number during communication establishment between OLT and ONU.

Referring to FIG. 4, the ONU connection information table 445 has a flag field 454, each flag being representative of whether PON-ID is already assigned and a field 455 for storing a serial number of ONU assigned with PON-ID. In the example shown in FIG. 4, a field for storing PON-ID is not provided because the field for storing PON-ID is not necessary if a memory address is one-to-one correspondence with PON-ID. The ONU connection information table 445 may have the field for storing PON-ID to register the serial number and PON-ID in one-to-one correspondence with each other. In the example shown in FIG. 4, since it is assumed that thirty two ONUs are connected at a maximum, the field up to PON-ID #32 is shown. The PON-ID assignment flag 454 takes a value "1" if PON-ID is already assigned, whereas it takes a value "0" if PON-ID is still not assigned. The PON-ID assignment flag may not be provided by storing a predetermined value (e.g., all 0s) in the ONU serial number storage field 455 if PON-ID is still not assigned.

Figure 5:
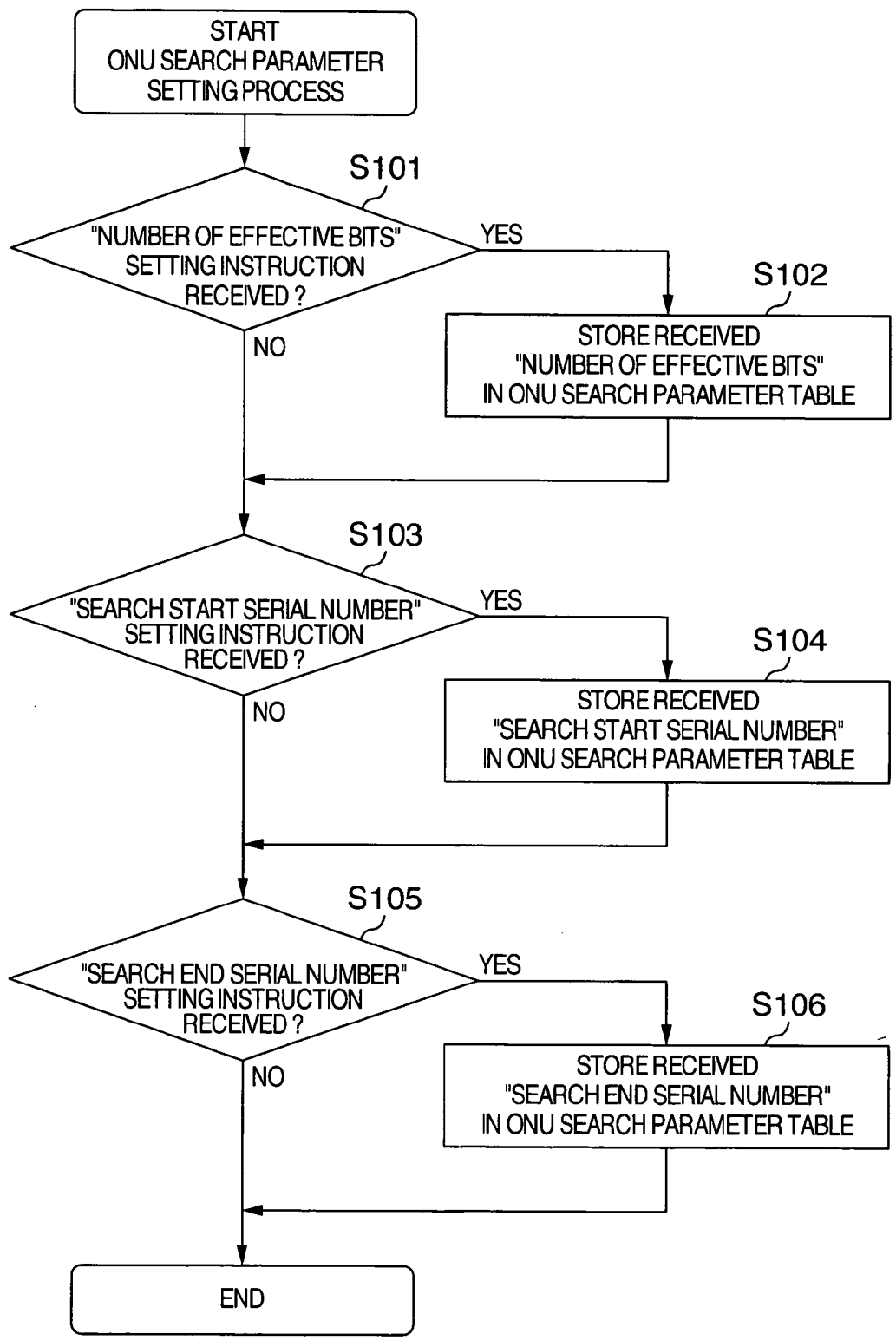
FIG. 5 shows a flow chart illustrating an example of an ONU search parameter setting process according to the present invention.

Next, the operation of the embodiment will be described. The ONU search parameter setting process 448 is a process of changing the settings of the ONU search parameter table 444. FIG. 5 is a flow chart illustrating the ONU search parameter setting process 448 according to the embodiment. The ONU search parameter setting process 448 is activated by the main control process 447 when a parameter setting change instruction is received from an external apparatus such as the operation apparatus 10 and initial setting terminal 80.

If the received contents are a "number of effective bits" setting instruction (S101 in FIG. 5), the ONU search parameter setting process 448 stores the received "number of effective bits" in the number of effective bits field 451 of the ONU search parameter table 444 (S102 in FIG. 5). If the received contents are a "search start serial number" setting instruction (S103 in FIG. 5), the ONU search parameter setting process 448 stores the received "search start serial number" in the search start serial number field 452 of the ONU search parameter table 444 (S104 in FIG. 5). If the received contents are a "search end serial number" setting instruction (S105 in FIG. 5), the ONU search parameter setting process 448 stores the received "search end serial number" in the search end serial number field 453 of the ONU search parameter table 444 (S106 in FIG. 5).

By providing the ONU search parameter setting process, it becomes possible to change the contents of the ONU search parameter table 444 as desired even after the parameters are set once, and it is possible to flexibly deal with the vendor definition contents of the number of ONUs actually installed in an ATM-PON system to be configured, and ONU serial numbers. If default values of the ONU search parameters are stored in advance in the ONU search parameter table 444 and used, the ONU search parameter setting process may not be provided.

For example, if thirty two ONUs are connected at a maximum, it can be expected that the serial number can be identified almost by 128 patterns=2 raised to power of 7, i.e., default values can be determined including from all "0s" to all "1s" patterns assuming that the number of effective bits is seven bits.

Figure 6:
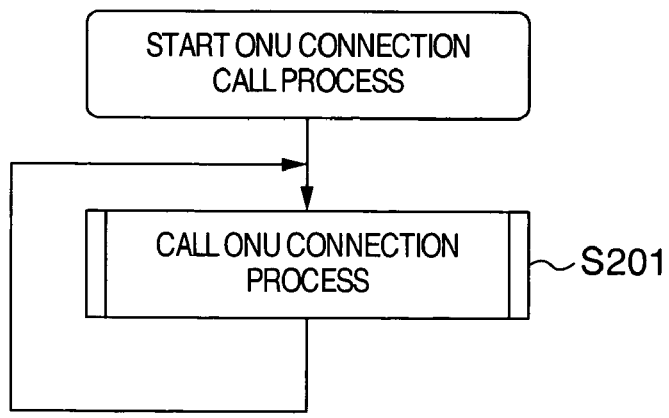
FIG. 6 shows a flow chart illustrating an example of an ONU connection call process according to the present invention.

The ONU connection call process 449 is a process of activating the ONU connection process 450. FIG. 6 is a flow chart illustrating the ONU connection call process 449 according to the embodiment.

The ONU connection call process 449 is activated by the main control process 447, for example, when OLT is activated. In the embodiment shown in FIG. 6, the ONU connection call process 449 activates the ONU connection process 450 (S201 in FIG. 6), and when the ONU connection process 450 is terminated, the ONU connection process 450 is activated again (S201 in FIG. 6. This operation is repeated.

Since the ONU connection process 450 is repeated as in the embodiment shown in FIG. 6, an OpS manager is not required to be conscious of ONU connection timings so that the ONU connection work becomes easy. Namely, since the ONU connection process 450 is repeated, it is not necessary for OLT to activate the ONU connection process via OpS each time ONU is connected. Therefore, the OpS manager and an ONU connection worker are not required to contact each other each time a connection work is performed.

Figure 7:
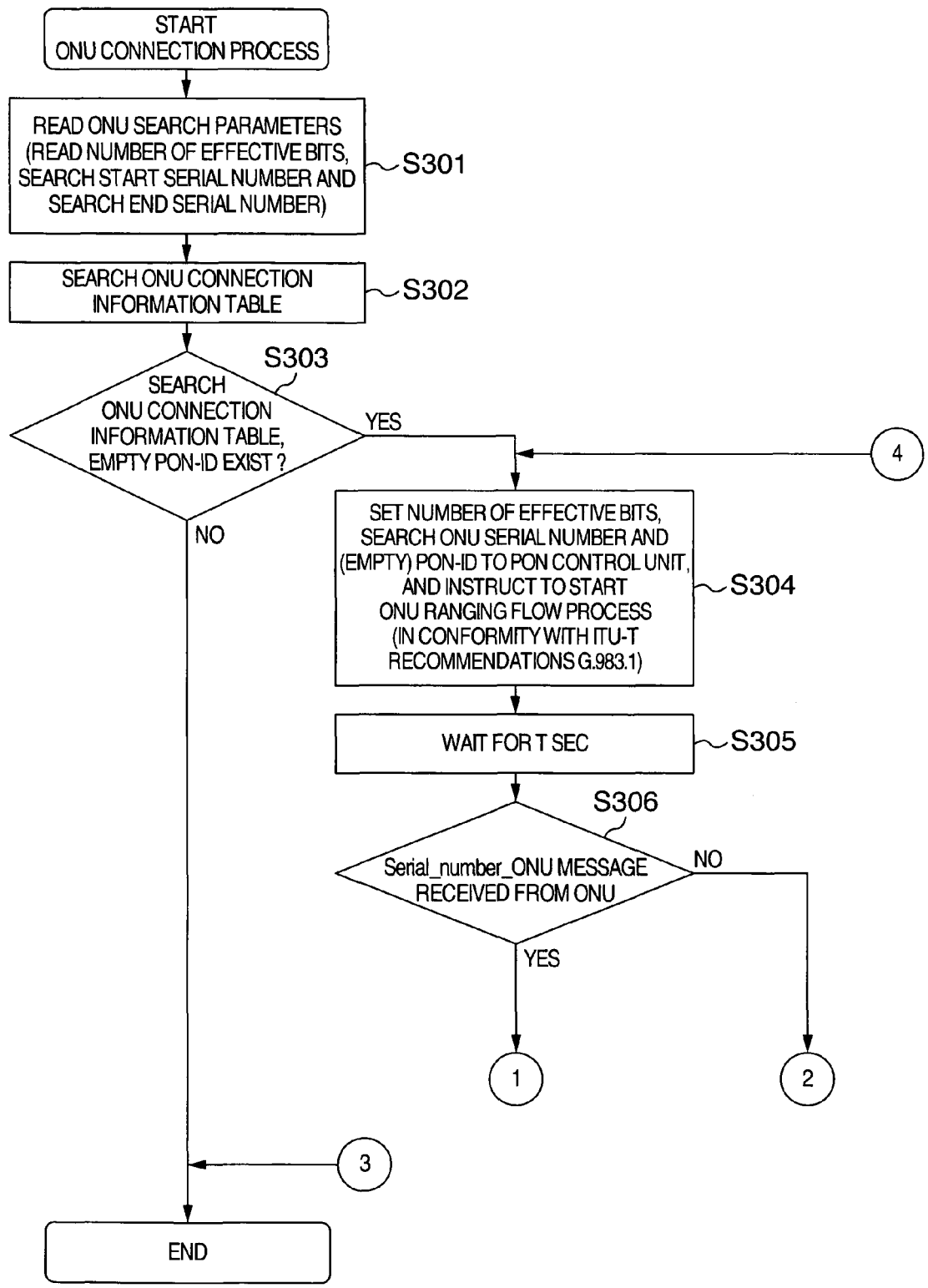
FIG. 7 shows a flow chart illustrating an example of an ONU connection process according to the present invention.
Figure 8:
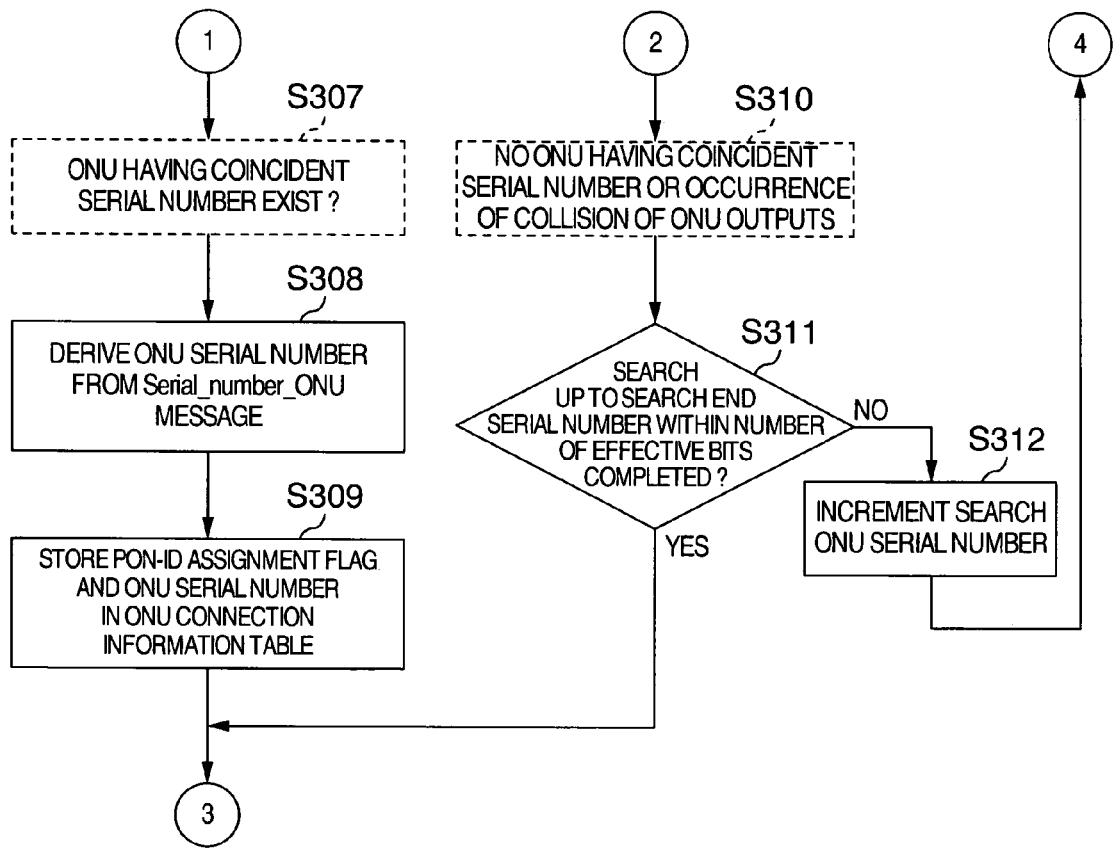
FIG. 8 shows a flow chart illustrating an example of an ONU connection process according to the present invention.

The ONU connection process 450 is a process of searching a serial number of an installed ONU and connecting the ONU. FIGS. 7 and 8 are flow charts illustrating the ONU connection process 450 according to the embodiment. As the ONU connection process 450 is activated, it reads the contents of the ONU search parameter table 444 (S301 in FIG. 7). Next, the ONU connection process 450 searches the ONU connection information table 445 (S302 in FIG. 7) to judge whether there is an empty PON-ID (S303 in FIG. 7). Whether there is an empty PON-ID is judged by searching PON-ID whose PON-ID assignment flag 454 shown in FIG. 4 indicates non-assignment or by other means. If there is no empty PON-ID (No at S303 in FIG. 7), the ONU connection process is terminated. Judgement at S303 in FIG. 7 prevents the wasteful ONU connection process from being executed, if the maximum number of ONUs are already connected.

If there is an empty PON-ID (Yes at S303 in FIG. 7), the number of effective bits, a search ONU serial number and an (empty) PON-ID are set to the PON control unit 470 and the PON control unit 470 is instructed to start the ONU ranging flow process (refer to ITU-T Recommendations G.983.1) (S304 in FIG. 7). The PON control unit 470 acquires the ONU serial number, assigns PON-ID and executes other operations in accordance with the ranging flow process, by using the number of effective bits, search ONU serial number and PON-ID set by the ONU connection process 450.

The ONU connection process 450 waits for T second (S305 in FIG. 7) to judge whether the PON control unit 470 receives a Serial_number_ONU message to be described later (S306 in FIG. 7).

If the Serial_number_ONU message is received (Yes at S306 in FIG. 7), this means that there is ONU having the coincident serial number within the set number of effective bits (S307 in FIG. 8). The ONU connection process 450 derives the correct serial number of ONU from the Serial_number_ONU message (S308 in FIG. 8), sets "assigned" to the PON-ID assignment flag storage field 454 of PON-ID in the ONU connection information table 445, stores the ONU serial number in the ONU serial number storage field 455 (S809 in FIG. 8) to terminate the process.

If the Serial_number_ONU message is not received (No at S306 in FIG. 7), it means that there is no ONU having a coincident serial number within the set number of effective bits or that there are a plurality of ONUs having the coincident serial number and the ONU outputs collide (S310 in FIG. 8). As described earlier, if there are a plurality of ONUs having the coincident serial number, ONU outputs are superposed on a return transmission path. Since the timing frame cannot be extracted due to optical interference, an optical signal cannot be received correctly to be recognized as "Non ONU response". In the method of this embodiment, the number of effective bits, search start serial number and search end serial number should be determined so as not to generate collision of ONU outputs. It is obviously possible that when the ONU output collision is considered, at Step next to Step S311 in FIG. 8, the number of effective bits is incremented (effective bits are increased) to return to Step S303 in FIG. 7 to continue the process. Namely, in order to surely verify that there is no ONU having the serial number coincident with a bit pattern in the range of the inquired number of effective bits, it is effective to inquire a bit pattern having the increased number of effective bits if the Serial_number_ONU message is not received. In this case, the increased number of effective bits may be registered in the ONU search parameter table 444.

Next, it is judged whether the search was completed up to the search end serial number within the number of effective bits (S311 in FIG. 8). If not completed (No at S311 in FIG. 8), the search serial number is incremented (S312 in FIG. 8) to return to S304 in FIG. 8. If completed (Yes at S311 in FIG. 8), the process is terminated. The completed search up to the search end serial number while the ONU connection process 450 is already executed, means that there is no ONU newly installed during the period from the preceding ONU connection process to the present ONU connection process. As described earlier, since the ONU connection process 450 is executed repetitively by the ONU connection call process 449, ONU newly installed after the operation start of OLT 40 can be automatically connected. Judgement of search completion up to the search end serial number within the number of effective bits is performed in the following manner. For example, if the search start serial number is 0x0000 0000 0000 0000 and the search end serial number is 0x0000 0000 0000 000F, there are 16 patterns. If the number of effective bits is set to 2 bits, four patterns of lower 2 bits, 00, 01, 10 and 11, are effective. In this case, only four patterns are searched.

Description will be made more in detail on acquiring an ONU serial number by the ranging flow process to be executed by the PON control unit 470. The frame format and the like of a message between OLT and ONU in the ATM-PON system are standardized by the ITU-T Recommendations G.983.1. FIG. 9 shows the payload contents of a PLOAM cell in a downstream (from OLT toward ONU). FIG. 10 shows the format of a broken line portion 601 in FIG. 9 corresponding to a Serial_number_mask message. Octet numbers 35 to 46 shown in FIG. 10 (602 in FIG. 10) correspond to the numbers 35 to 46 (601 in FIG. 9) of the payload contents shown in FIG. 9. Reference numeral 603 in FIG. 10 represents the number of effective bits counted from LSB to be used for serial number comparison, and reference numeral 604 in FIG. 10 represents a search serial number for comparison. Namely, the Serial_number_mask message is a message urging ONU, having a serial number coincident with the search serial number 604 within the number 603 of effective bits, to return a response.

At the same time when the Serial_number_mask message is transmitted to ONU, OLT also transmits the information (transmission permission) on transmission grant of an up-signal, called a "grant", to ONU. If the Serial_number_mask message is coincident with the ONU serial number and the grant is received, ONU returns the Serial_number_ONU message back to OLT.

Figure 11:
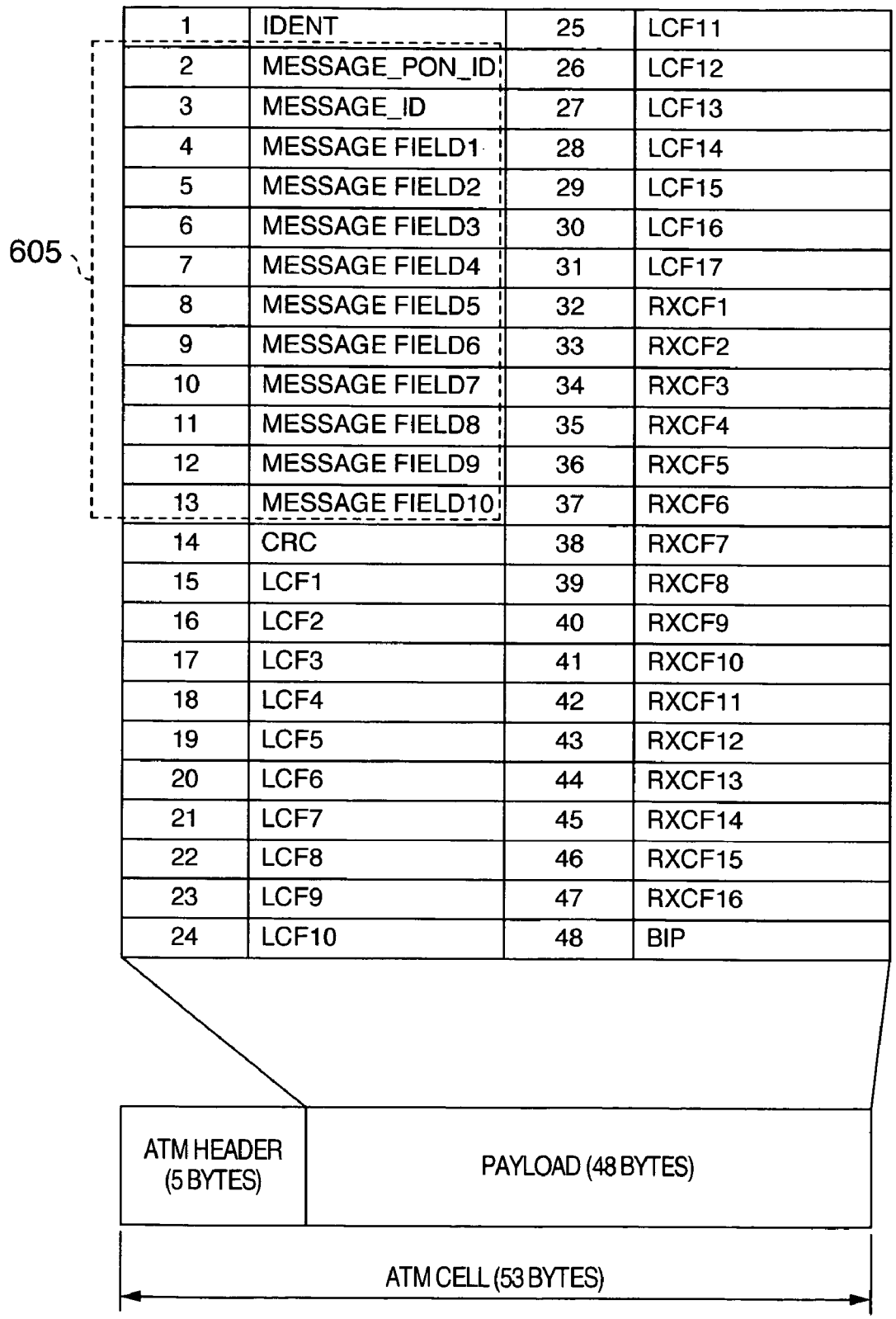
FIG. 11 is an illustrative diagram showing the payload contents of a PLOAM cell in an upstream.

FIG. 11 shows the payload contents of a PLOAM cell in an upstream (from ONU toward OLT). FIG. 12 shows the format of a broken line portion 605 in FIG. 11 corresponding to a Serial_number_ONU message. Octet numbers 2 to 13 shown in FIG. 12 (606 in FIG. 12) correspond to the numbers 2 to 13 (605 in FIG. 11) of the payload contents shown in FIG. 11. Reference numeral 607 in FIG. 12 represents the serial number of ONU itself which returns the Serial_number_ONU message back to OLT.

Upon reception of the "grant" from OLT, ONU returns the Serial_number_ONU message back to OLT. In this case, since OLT sends the "grant" to all ONUs coincident with the Serial_number_mask message, a plurality of ONUs may respond. However, if a plurality of ONUs send responses at the same time, the outputs are superposed on the transmission line so that OLT cannot receive the return message. Therefore, OLT searches the ONU serial number in such a manner that only one ONU identified by the Serial_number_mask message returns the Serial_number_onu message, acquires the ONU serial number and executes the ranging flow process.

FIG. 13 shows the sequence of ONU serial number acquisition between OLT and ONU, with particular search serial numbers and a particular serial number assigned to ONU and the like being given. In the example shown in FIG. 13, the serial number of ONU 60 is 0xAAAA AAAA 1234 1108, the number of effective bits used for ONU search is 6 bits, and the search start serial number is 0x0000 0000 0000 0001.

During the ranging flow process, the PON control unit 470 in OLT 40 sends the Serial_number_mask message to all ONU under the control of OLT. The Serial_number_ONU message to be sent first is indicated at S401 in FIG. 113. The message format corresponding to S401 is shown at 501 in FIG. 14. Octet numbers 35 to 26 of the message format 501 shown in FIG. 14 correspond to the Octet numbers 35 to 46 of the payload shown in FIG. 9.

Figure 15:
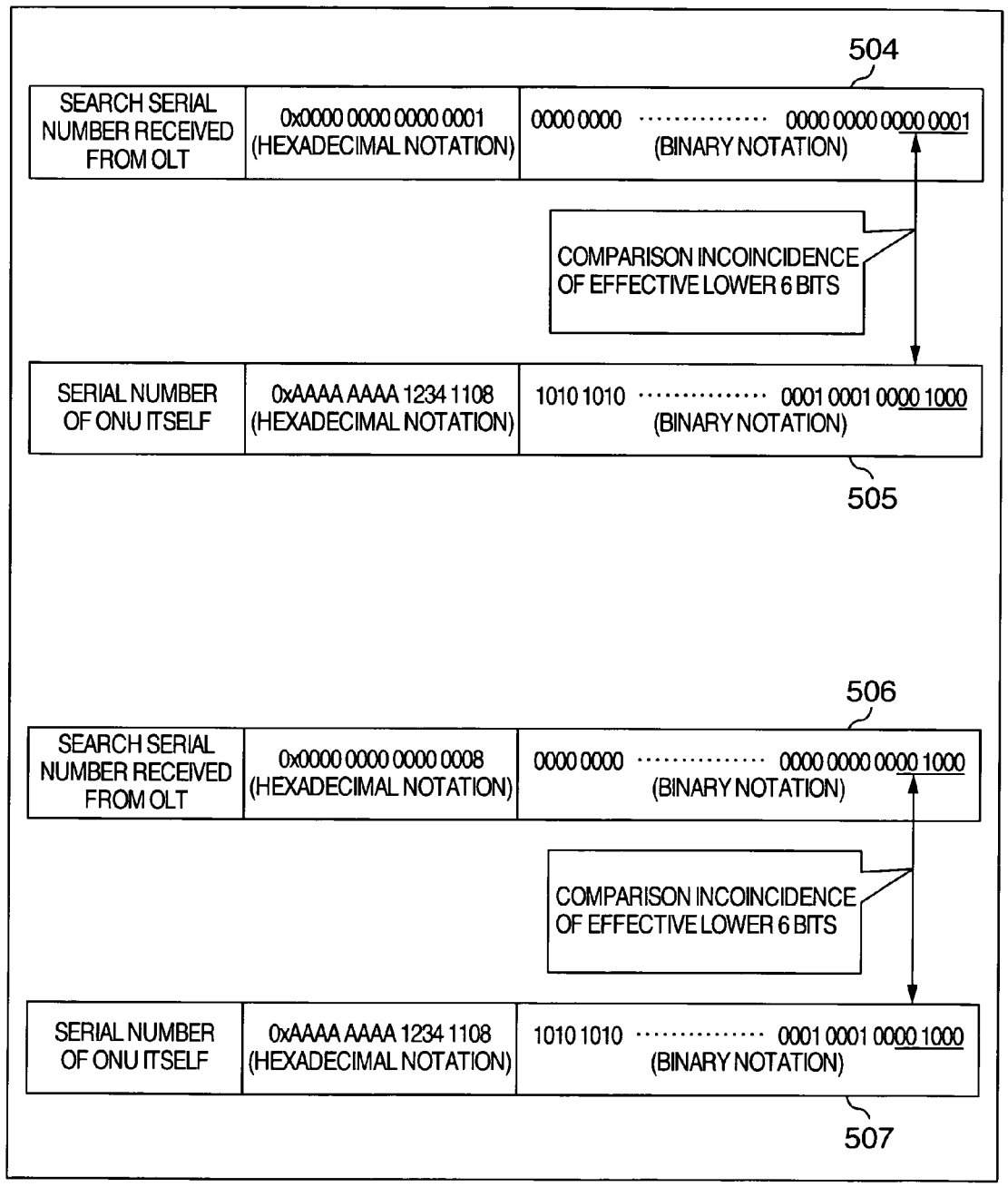
FIG. 15 is a diagram showing an example of ONU serial number comparison in the sequence example shown in FIG. 13.

At ONU 60 received the message S401, a comparison process is executed between the search serial number contained in the message S401 and the serial number of ONU 60. Reference numeral 504 in FIG. 15 indicates the search serial number received from OLT and corresponding to the message S401 in FIG. 13, and reference numeral 505 in FIG. 15 indicates the serial number of ONU 60. The search serial number 504 and the ONU serial number 505 shown in FIG. 15 are incoincident within the lower effective six bits. Therefore, ONU 60 will not respond to OLT 40. Similarly, ONU 60 will not respond to messages S402 and S403 shown in FIG. 13.

The format of a message S404 in FIG. 13 is shown at 502 in FIG. 14. Octet numbers 2 to 13 of the message format 503 shown in FIG. 14 correspond to Octet numbers 2 to 13 of the payload shown in FIG. 12.

ONU 60 received the message S404 executes a comparison process in a manner similar to that described above. Reference numeral 506 in FIG. 15 indicates the search serial number received from OLT 40 shown in FIG. 13, and reference numeral 507 indicates the serial number of ONU 60. The search serial number 506 and ONU serial number 507 are coincident within the lower effective six bits. Therefore, ONU 60 responds by sending the Serial_number_ONU Message (S405 in FIG. 13) to OLT 40. The format of the message S405 in FIG. 13 is indicated at 503 in FIG. 14. As indicated in a broken line portion 607 shown in FIG. 12, the Serial_number_ONU message contains the ONU serial number of ONU 60 itself. Therefore, OLT 40 can acquire and identify the correct serial number of ONU 60.

After OLT 60 identifies the serial number of ONU 40, assignment of PON-ID and the like are performed in accordance with the ranging flow process of ITU-T Recommendations G.983.1 to establish connection between OLT and ONU.

As described above, according to the first embodiment, when ONU is installed in an ATM-PON system, it is not necessary that an ONU installing worker and an OpS manager contact each other and input an ONU serial number from OpS to OLT. Further, by automatically searching ONU serial numbers from the search start serial number to the search end serial number within the predetermined number of effective bits, it becomes possible to automatically and efficiently connect within a realistic pattern range.

Second Embodiment

Figure 16:
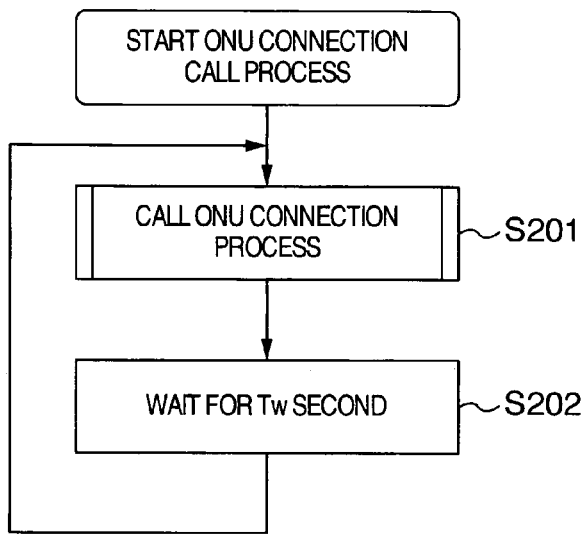
FIG. 16 is a flow chart illustrating an ONU connection call process 449 according to a second embodiment of the present invention.

FIG. 16 is a flow chart illustrating an ONU connection call process 449 of the second embodiment according to a modification of the first embodiment. The ONU connection call process 449 shown in FIG. 16 activates the ONU connection process 450 (S201 in FIG. 16), and after the ONU connection process 450 is completed, the process waits for Tw second (S202 in FIG. 16) and then the ONU connection process 450 is activated again (S202 in FIG. 16).

According to the method of the second embodiment, a load on CPU 441 to be caused by always executing the ONU connection process 450 repetitively can be reduced by providing a wait for Tw second.

Third Embodiment

Figure 17:
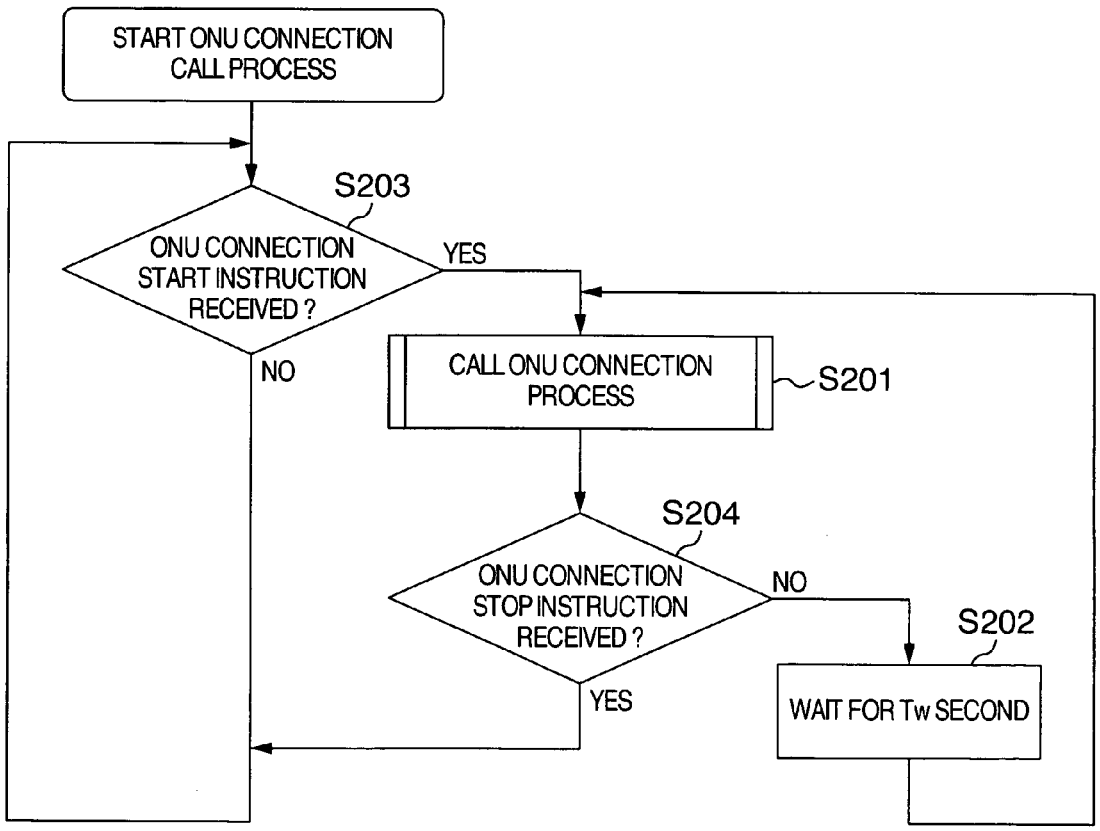
FIG. 17 is a flow chart illustrating an ONU connection call process 449 according to a third embodiment of the present invention.

FIG. 17 is a flow chart illustrating the ONU connection call process 449 of the third embodiment according to another modification of the first embodiment. The ONU connection call process 449 shown in FIG. 17 judges whether an instruction of starting the ONU connection process is received from OpS 10 or the initial setting terminal 80 (S203 in FIG. 17). If an ONU connection process start instruction is received (Yes at S203 in FIG. 17), the ONU connection process 450 is activated (S201 in FIG. 17). After the ONU connection process 450 is completed, it is judged whether an instruction of stopping the ONU connection process is received from OpS 10 or the initial setting terminal 80 (S204 in FIG. 17).

When the ONU connection stop instruction is received (Yes at S204 in FIG. 17), the ONU connection process 450 will not be activated until the ONU connection process start instruction is received again from OpS 10 or the initial setting terminal 80. If the ONU connection stop instruction is not received (No at S204 in FIG. 17), the process waits for Tw second (S202 in FIG. 17, and then the ONU connection process 450 is again activated.

According to the method of the third embodiment, for example, only when ONU is newly installed, OpS 10 or the initial setting terminal 80 instructs to start the ONU connection process, and after the ONU automatic connection is completed, OpS 10 or the initial setting terminal 80 instructs to stop the ONU connection process so that a load on CPU 441 can be reduced further as compared to the second embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical line termination (OLT) connecting a plurality of optical network units (ONUs) assigned different identification numbers in a star type via optical fibers, comprising:
    means for storing the number of effective bits for determining a range of searching the identification numbers of said ONUs;
    means for storing a search start number from which searching the identification numbers of said ONUs starts;
    means for storing a search end number at which searching the identification numbers of said ONUs ends;

means for incrementing a search number to be used for inquiring said ONU about the identification number, from said search start number to said search end number; and means for transmitting to said ONUs a message for inquiring about whether an incremented search number is coincident with said identification number within a range of said number of effective bits each time said search number is incremented.

2. The OLT according to claim 1, further comprising means, responsive to a response from one of said number of ONUs indicating that said search number coincides with said identification number, for storing an identification number of said responding ONU contained in said response.

3. The OLT according to claim 1, further comprising means, responsive to a notice of said number of effective bits, said search start number or said search end number from an external apparatus, for instructing a corresponding one of said storing means to store information on said notice.

* * * * *